United States Patent
Kovacs et al.

(10) Patent No.: US 11,057,947 B2
(45) Date of Patent: Jul. 6, 2021

(54) RADIO NETWORK TEMPORARY IDENTIFIER GENERATION

(71) Applicant: NOKIA TECHNOLOGIES OY, Espoo (FI)

(72) Inventors: Istvan Zsolt Kovacs, Aalborg (DK); Jeroen Wigard, Klarup (DK); Thomas Jacobsen, Aalborg East (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 632 days.

(21) Appl. No.: 15/379,884

(22) Filed: Dec. 15, 2016

(65) Prior Publication Data
US 2018/0176964 A1    Jun. 21, 2018

(51) Int. Cl.
*H04W 76/11*    (2018.01)
*H04W 76/15*    (2018.01)
(Continued)

(52) U.S. Cl.
CPC .............. *H04W 76/11* (2018.02); *H04W 8/26* (2013.01); *H04W 74/004* (2013.01);
(Continued)

(58) Field of Classification Search
None
See application file for complete search history.

(56) References Cited

U.S. PATENT DOCUMENTS

2001/0053697 A1*  12/2001  Nakada ............. H04W 74/0875
                                                                455/456.2
2008/0139214 A1*  6/2008  Sun ..................... H04W 72/042
                                                                455/450

(Continued)

FOREIGN PATENT DOCUMENTS

| EP | 2 925 076 A1 | 9/2015 |
|---|---|---|
| GB | 2487780 A | 8/2012 |
| WO | 2016/008538 A1 | 1/2016 |

OTHER PUBLICATIONS

International Search Report and Written Opinion corresponding to International Application No. PCT/FI2017/050839, dated Mar. 19, 2018.

*Primary Examiner* — Gregory B Sefcheck
*Assistant Examiner* — Joshua Smith
(74) *Attorney, Agent, or Firm* — Squire Patton Boggs (US) LLP (57) ABSTRACT

Various communication systems may benefit from improved network access. For example, communication systems may benefit from deriving a radio network temporary identification at both a user equipment and a base station, without requiring additional uplink signaling. A method, in certain embodiments, may include sending a short identification from a user equipment to a base station during a contention based access instance. The short identification is generated based on an initial cell radio network temporary identification. The method may also include receiving at the user equipment a user equipment radio network temporary identification from the base station. The user equipment radio network temporary identification is based on the short identification. In addition, the method may include generating at the user equipment a subsequent cell radio network temporary identification based at least on the short identification and the received user equipment radio network temporary identification.

20 Claims, 9 Drawing Sheets

(51) Int. Cl.
*H04W 76/38* (2018.01)
*H04W 8/26* (2009.01)
*H04W 74/08* (2009.01)
*H04W 74/00* (2009.01)
*H04W 84/04* (2009.01)

(52) U.S. Cl.
CPC ..... *H04W 74/006* (2013.01); *H04W 74/0833* (2013.01); *H04W 76/15* (2018.02); *H04W 76/38* (2018.02); *H04W 84/045* (2013.01); *H04W 74/002* (2013.01)

(56) References Cited

U.S. PATENT DOCUMENTS

| | | | |
|---|---|---|---|
| 2010/0105404 A1 | 4/2010 | Palanki et al. | |
| 2010/0189071 A1* | 7/2010 | Kitazoe | H04W 74/002 370/331 |
| 2011/0070900 A1* | 3/2011 | Shi | H04W 68/00 455/458 |
| 2015/0003394 A1* | 1/2015 | Ono | H04W 72/042 370/329 |
| 2015/0147995 A1* | 5/2015 | Bontu | H04W 4/90 455/404.1 |

* cited by examiner

RADIO NETWORK TEMPORARY IDENTIFIER GENERATION

BACKGROUND

Field

Various communication systems may benefit from improved network access. For example, communication systems may benefit from generating a radio network temporary identification at both a user equipment and a base station, without requiring additional uplink signaling.

Description of the Related Art

3rd Generation Partnership Project (3GPP) radio access network (RAN) technologies utilize both contention based (CB) access and scheduled based (SB) access. When a user equipment (UE) seeks to establish a connection with a network, the UE must first request access to the network. The request from the UE to the network often initiates random access procedures in which signals are exchanged between the UE and the network. The random access procedures used to establish the connection between the UE and the network are contention based. Once contention based access is granted to the UE by the network, the UE will then switch to SB access for future uplink and downlink data transmissions. In SB access, the UE may access the network according to the availability of the network.

In 5th generation (5G) network technology, message radio access solutions are being developed for new radio (NR) access. CB radio access can help to reduce the overhead from SB signaling and radio resource control (RRC) configuration messages. CB radio access assumes that UE is pre-configured and/or can be signaled the relevant radio access parameters when the UE is in an inactive state. The radio access parameters can be adapted by the RAN according to the overall traffic load or traffic demands exhibited by the network.

In some NR technology, such as machine type communications, the UEs have low data rate requirements and infrequent uplink or downlink data transmissions. The signaling overhead should be minimized for such NR technology. Utilizing stage 1 or stage 2 CB access can help to avoid some RRC signaling. Using only CB access, however, only allows for the transmission of a very low number of data bytes with sufficiently high decoding probability. The RAN may therefore allow for switching the same UE between CB-access and SB-access.

In switching between CB-access and SB-access, random access (RA) radio network temporary identification (RNTI) and cell RNTI are used. The RNTI used in Long Term Evolution (LTE) access is 16 bits long, and the RNTI in 5G NR could be longer.

SUMMARY

A method, in certain embodiments, may include sending a short identification from a user equipment to a base station during a contention based access instance. The short identification may be generated based on an initial cell radio network temporary identification. The method may also include receiving at the user equipment a user equipment radio network temporary identification from the base station. In addition, the method may include generating at the user equipment a subsequent cell radio network temporary identification based at least on the short identification and the received user equipment radio network temporary identification.

According to certain embodiments, an apparatus may include at least one memory including computer program code, and at least one processor. The at least one memory and the computer program code may be configured, with the at least one processor, to cause the apparatus at least to send a short identification from a user equipment to a base station during a contention based access instance. The user equipment identification may be generated based on an initial cell radio network temporary identification. The at least one memory and the computer program code may also be configured, with the at least one processor, at least to receive at the user equipment a user equipment radio network temporary identification from the base station. In addition, the at least one memory and the computer program code may also be configured, with the at least one processor, at least to generate at the user equipment a subsequent cell radio network temporary identification based at least on the short identification and the received user equipment radio network temporary identification.

An apparatus, in certain embodiments, may include means for sending a short identification from a user equipment to a base station during a contention based access instance. The short identification may be generated based on an initial cell radio network temporary identification. The apparatus may also include means for receiving at the user equipment a user equipment radio network temporary identification from the base station. In addition, the apparatus may include means for generating at the user equipment a subsequent cell radio network temporary identification based at least on the short identification and the received user equipment radio network temporary identification.

According to certain embodiments, a non-transitory computer-readable medium encoding instructions that, when executed in hardware, perform a process. The process may include sending a short identification from a user equipment to a base station during a contention based access instance. The short identification may be generated based on an initial cell radio network temporary identification. The process may also include receiving at the user equipment a user equipment radio network temporary identification from the base station. In addition, the process may include generating at the user equipment a subsequent cell radio network temporary identification based at least on the short identification and the received user equipment radio network temporary identification.

According to certain embodiments, a computer program product encoding instructions for sending a short identification from a user equipment to a base station during a contention based access instance. The short identification may be generated based on an initial cell radio network temporary identification. The method may also include receiving at the user equipment a user equipment radio network temporary identification from the base station. In addition, the method may include generating at the user equipment a subsequent cell radio network temporary identification based at least on the short identification and the received user equipment radio network temporary identification.

A method, in certain embodiments, may include receiving a short identification at a base station from a user equipment during a contention based access instance. The user equipment identification may be based on an initial cell radio network temporary identification The method may also include generating at the base station a user equipment radio network temporary identification. In addition, the method may include generating at the base station a subsequent cell radio network temporary identification based at least on the short identification and the user equipment radio network temporary identification.

According to certain embodiments, an apparatus may include at least one memory including computer program code, and at least one processor. The at least one memory and the computer program code may be configured, with the at least one processor, to cause the apparatus at least to receive a short identification at a base station from a user equipment during a contention based access instance. The user equipment identification may be based on an initial cell radio network temporary identification. The at least one memory and the computer program code may also be configured, with the at least one processor, at least to generate a user equipment radio network temporary identification. In addition, the at least one memory and the computer program code may also be configured, with the at least one processor, at least to generate at the base station a subsequent cell radio network temporary identification based at least on the short identification and the user equipment radio network temporary identification.

An apparatus, in certain embodiments, may include means for receiving a short identification at a base station from a user equipment during a contention based access instance. The user equipment identification may be based on an initial cell radio network temporary identification. The apparatus may also include means for generating at the base station a user equipment radio network temporary identification. In addition, the apparatus may include means for generating at the base station a subsequent cell radio network temporary identification based at least on the short identification and the user equipment radio network temporary identification.

According to certain embodiments, a non-transitory computer-readable medium encoding instructions that, when executed in hardware, perform a process. The process may include receiving a short identification at a base station from a user equipment during a contention based access instance. The user equipment identification may be based on an initial cell radio network temporary identification. The process may also include generating at the base station a user equipment radio network temporary identification. In addition, the process may include generating at the base station a subsequent cell radio network temporary identification based at least on the short identification and the user equipment radio network temporary identification.

According to certain embodiments, a computer program product encoding instructions for performing a process according to a method including receiving a short identification at a base station from a user equipment during a contention based access instance. The user equipment identification may be based on an initial cell radio network temporary identification. The method may also include generating at the base station a user equipment radio network temporary identification. In addition, the method may include generating at the base station a subsequent cell radio network temporary identification based at least on the short identification and the user equipment radio network temporary identification.

BRIEF DESCRIPTION OF THE DRAWINGS

For proper understanding of the invention, reference should be made to the accompanying drawings, wherein.

DETAILED DESCRIPTION

Certain embodiments provide for UE radio access and the generation of a RNTI used for CB-access and SB data transmissions. Certain embodiments also allow for the generation of a subsequent RNTI at both the user equipment and the base station, without additional UL signaling. The subsequent RNTI may be generated based at least in part on information bits contained in the CB-access header data. The generation of the subsequent RNTI at both the UE and the base station may allow for a lower control plane overhead of the UE when switching between CB-access and SB-access. Some of the embodiments may consider how the UE can be identified on the physical (PHY) layer Media Access Control (MAC) layer, and how much signaling may be used to set up the network identifications.

Figure 1:
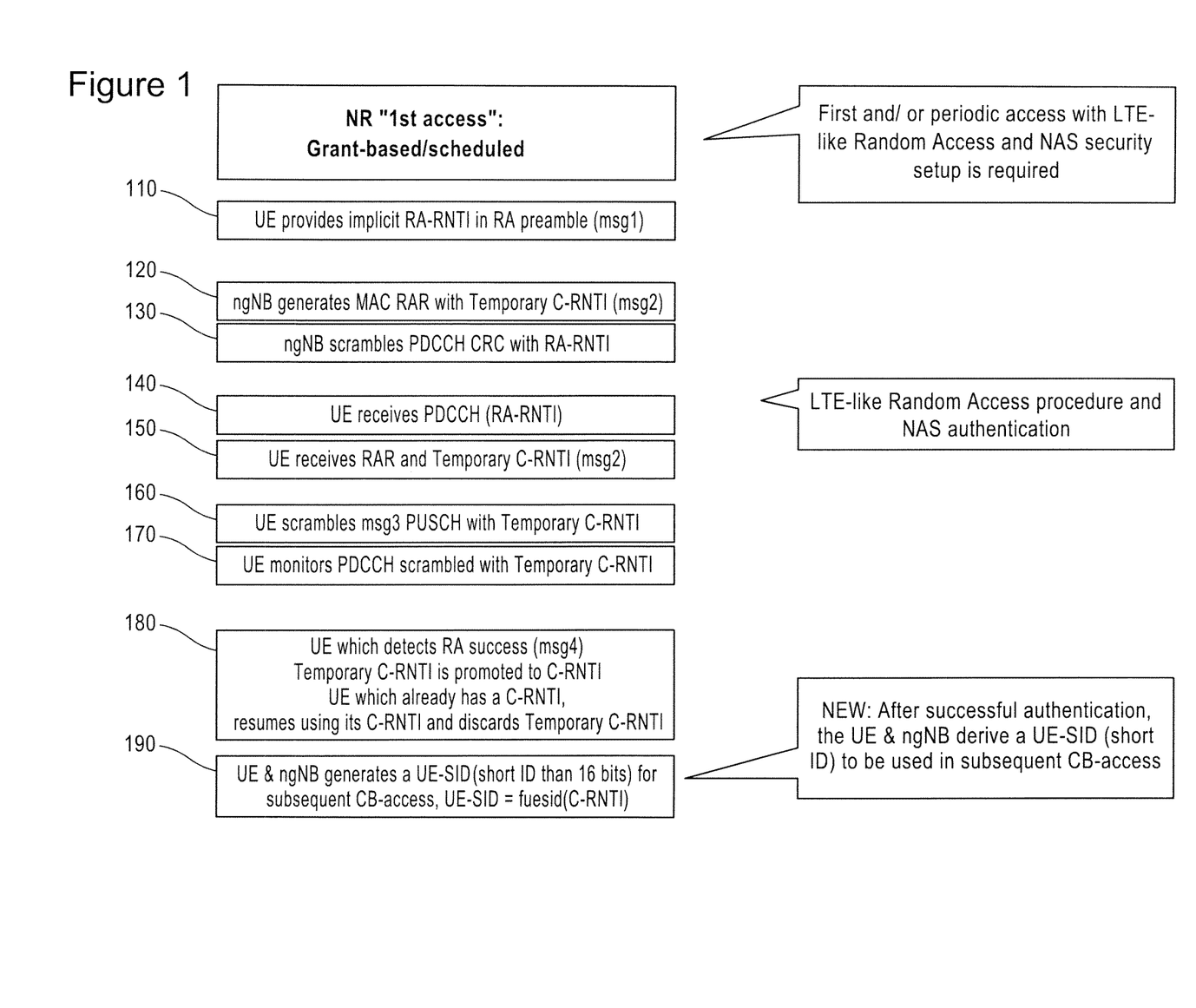
FIG. 1 illustrates a block diagram according to certain embodiments.

FIG. 1 illustrates a block diagram according to certain embodiments. In particular, FIG. 1 illustrates radio access procedures in which the UE may be authenticated or re-authenticated for non-access stratum (NAS) connectivity. Steps 110-180 in FIG. 1 may be similar to network radio access procedures in LTE, while added step 190 may illustrate a feature according to certain embodiments. The procedures illustrated in FIG. 1 may be similar to network radio access procedures in LTE, and may be used for either first or initial access of the UE to the network, or for re-authentication of the UE. The UE may utilize CB-access when gaining authorization by the network. In step 110, the UE provides an implicit RA-RNTI in the RA preamble sent from the UE to the network. The RA preamble may be sent in a first message (msg1) to an entity in the network, such as a new generation NodeB (ngNB).

Upon receiving the RA preamble, the ngNB may generate a MAC Random Access Response (RAR), as shown in step 120. The MAC RAR may include at least a temporary cell RNTI (C-RNTI). As shown in step 130, the ngNB may also scramble or configure the physical downlink control channel (PDCCH) cyclic redundancy check (CRC) with the RA-RNTI. CRC may be used by the network for error detection of packets being transmitted on the PDCCH. The ngNB may then send the MAC RAR and the temporary C-RNTI to the user equipment in a second message (msg2). In step 140, the UE receives information relating to the PDCCH, which it may detect using the RA-RNTI, and also receives msg2 on the PDCCH, as shown in step 150.

In step 160, the UE scrambles a physical uplink shared control channel (PUSCH) with the temporary C-RNTI it received from the network in step 150. Using the PUSCH, the UE sends a third message (msg3) on the PUSCH requesting an RRC connection to the ngNB. The UE may also monitor the PDCCH, which may also be scrambled with the temporary C-RNTI, as shown in step 170. In step 180, the ngNB may respond with a contention resolution message, referred to as the fourth message (msg4). The contention resolution message can indicate to the UE that the radio access procedure has been successful, and that the UE has been authenticated by the network. The temporary C-RNTI may be promoted to a non-temporary C-RNTI, and the UE may discard the temporary tag of the C-RNTI and utilize the C-RNTI on a non-temporary basis for future transmissions to and from the UE.

Rather than continuing to use the C-RNTI for subsequent access to the network, however, in certain embodiments the UE may generate a new UE short identification (UE-SID) based at least in part on the C-RNTI, as shown in step 190. In some other embodiments, a base station, such as an ngNB, may generate independently the new UE-SID based on fuesid( ) for example. The UE-SID may be shorter in length than the C-RNTI, thus requiring less resources to transmit. The C-RNTI may be 16 bits long while the UE-SID may have less bits. For example, the UE-SID may be 4 bits, which would allow UE-SID to fit the limited capability of the CB-access PHY layer configuration. The function used to generate the UE-SID may be labeled fuesid( ), for example. In some embodiments, once the UE-SID is generated by the UE, the UE may discard the C-RNTI immediately or after a predetermined amount of time after generation of the UE-SID. The UE-SID may then be used by the UE and the ngNB to help facilitate subsequent CB-access instances.

Figure 2:
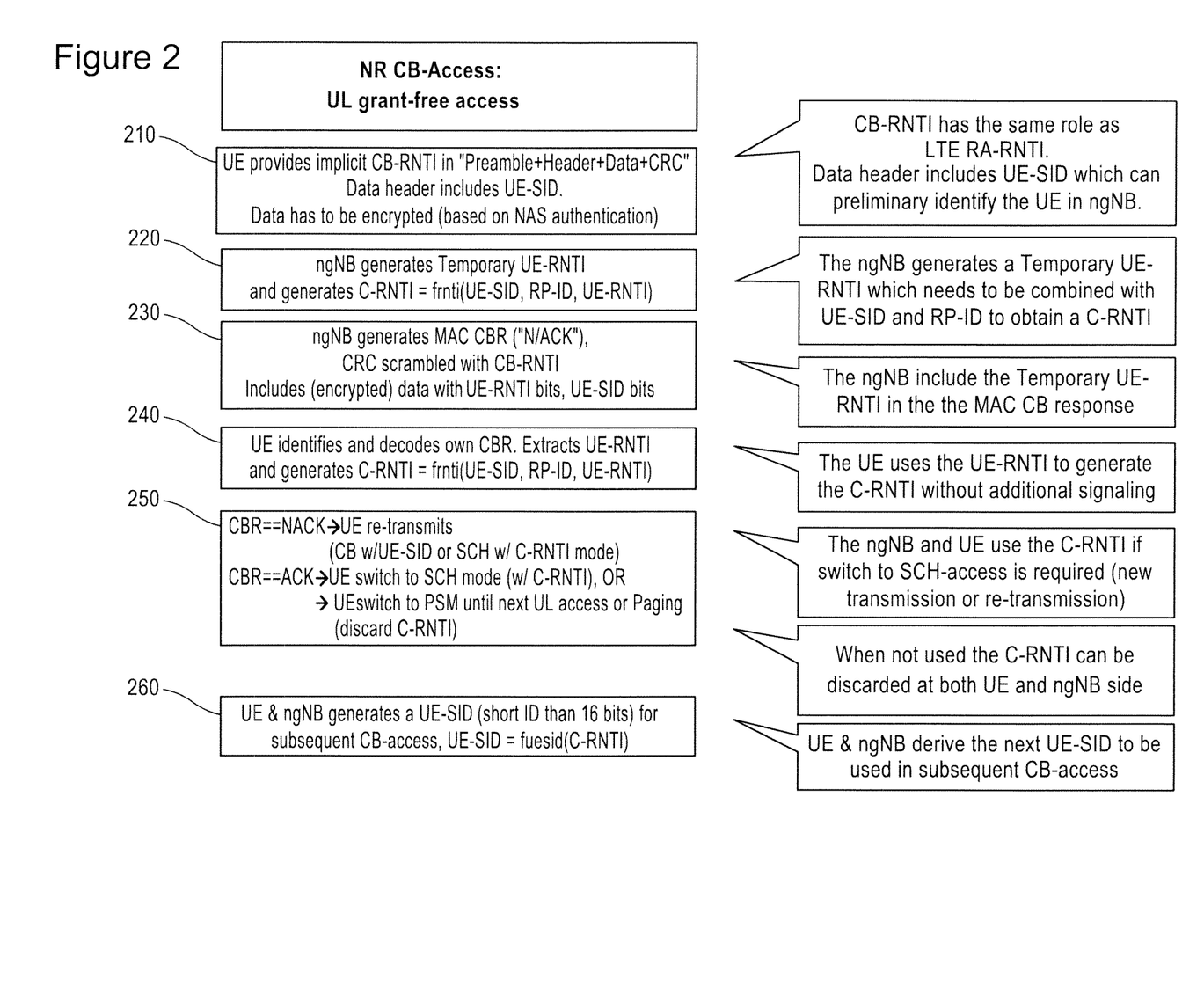
FIG. 2 illustrates a block diagram according to certain embodiments.

FIG. 2 illustrates a block diagram according to certain embodiments. In particular, FIG. 2 illustrates subsequent CB-access once the UE-SID, generated in FIG. 1, is sent to the ngNB from the UE. In step 210, the UE sends a message to the network entity, such as a base station. The message may include a preamble, a header, data, and/or CRC information. The message may also include implicit CB-RNTI, which may be similar to RA-RNTI in LTE. The header, for example, may include the UE-SID generated in FIG. 1 as a certain field of the header. In certain embodiments, the ngNB receiving the header may be decodable by the ngNB, without the ngNB having to decode or decrypt the entire data field included in the message. The data included in the message may be encrypted based on the NAS authentication determined in FIG. 1. Any form of encryption may be used to encrypt the data sent to the ngNB.

The ngNB may then generate a temporary UE-RNTI, as shown in step 220. The UE-RNTI may be determined at random, independent of the UE-SID, or based in part on the UE-SID. The UE-RNTI may be shorter than the full length of the subsequent C-RNTI. For example, if the subsequent C-RNTI may have a length of 16 bits, while the UE-RNTI may have a length of 5 or 8 bits. In some other embodiments, the UE-RNTI determined by the ngNB may be longer than the UE-SID. For example, the UE-SID may have a length of 4 bits while the UE-RNTI may have a length of 8 bits. The subsequent C-RNTI, meanwhile, may have a length greater than or equal to 16 bits.

In step 230, the ngNB may generate and send at least one downlink MAC CB-access response (CBR) to the UE. The CBR may be considered feedback from the ngNB, and may include a field of bits, for example 4-8 bits, for additional control information. At least a part of the additional control information in the CBR may be comprised of UE-RNTI bits that are generated by the ngNB. The feedback may be identified by the UE, in a similar matter to the RAR being identified by the UE in LTE. The 4-8 bits included in the CBR may be encrypted control information. The control information may be encrypted in accordance with the encryption of the uplink data used by the UE. In addition, the CBR in some embodiment may include an acknowledgement (ACK) or a negative acknowledgment (NACK). The CBR may also, in certain embodiments, include a switch to SB-access mode command.

In certain embodiments, as shown in step 220, the ngNB may generate a subsequent C-RNTI using the UE-SID and/or the UE-RNTI. The function used to generate the subsequent C-RNTI may be, for example, frnti( ). The subsequent C-RNTI may be generated without having additional uplink signaling from the UE to the ngNB. In step 240, the UE may identify and decode the CBR received from the ngNB. The decoding of the CBR may be similar to CRC scrambling in LTE. The UE may extract the UE-RNTI from the CBR and generate the subsequent C-RNTI in the UE. The subsequent C-RNTI may be generated using the UE-SID and/or the UE-RNTI. In other words both the UE and the ngNB may generate the subsequent C-RNTI on their own, without receiving a separate signal that includes the subsequent C-RNTI from each other.

In some embodiments, when the UE and/or the ngNB generate the subsequent C-RNTI, the UE and/or the ngNB may account for the resource pool (RP) from which the UE initiated the CB-access. The RP may be associated with a unique identification (RP-ID) that may be used by the UE and/or the ngNB when generating the subsequent C-RNTI. The RP-ID bits may be shorter in length than the length of the subsequent C-RNTI. For example, the C-RNTI may be 16 bits while the RP-ID may account for 4 bits. In certain embodiments, the RP-ID may be allocated to the UE by the ngNB using, for example, system information. The RP-ID may inform the UE which RP the UE may access.

Generating the subsequent C-RNTI, in some embodiment, may involve merely adding the UE-SID bits, the UE-RNTI bits, and/or the RP-ID bits. For example, if the UE-SID comprises 4 bits, the UE-RNTI comprises 8 bits, and the RP-ID comprises 4 bits, the subsequent C-RNTI may comprise 16 bits. In other embodiments, generating the subsequent C-RNTI may include any function that uses the bits of at least the UE-SID, the UE-RNTI, or the RP-ID.

In one example, the initial C-RNTI may equal 1010 1111 1010 0010. The UE may use the initial C-RNTI to generate a UE-SID equal to 0010, by using the last four bits of the initial C-RNTI. The UE may then access RP 1111. The UE-SID 0010 may be included as part of a header of a CB-access message sent to the base station. The network can map the UE-SID back to the initial C-RNTI 1010111110100010. The ngNB then generates the random UE-RNTI of 8 bits, such as 01010101. The ngNB may then send a CBR to the UE including the UE-RNTI. The ngNB may then generate a subsequent or new C-RNTI using the UE-SID, UE-RNTI, and/or RP-ID, which is represented by 0010010101011111. The subsequent C-RNTI, in this embodiment, may be generated by adding the bits of UE-SID, UE-RNTI, and RP-ID.

In step 250, when a NACK is received by the UE, the UE may retransmit the CB-access message, including the UE-SID within the header. The ngNB may then repeat steps 210, 220, and 230. In certain embodiments, steps 210, 220, and 230 may be repeated until a positive acknowledgment is sent from ngNB to the UE. In comparison, if an ACK is received by the UE from the ngNB in the CBR, the UE may use the subsequent C-RNTI generated by the UE when requested to switch to a SB-access mode. The scheduling mode may use SB-access to carry new data or retransmit data to and/or from the UE.

In other embodiments, upon receiving an ACK in step 250, the UE may switch to a power saving mode (PSM) until the next uplink access and/or until the UE is paged. Upon entering the PSM, the UE may discard the C-RNTI. As such, when the UE awakes from the PSM, it may generate a new subsequent C-RNTI. In some embodiments, the UE may maintain or store the UE-SID when entering the PSM. The UE, in step 260, may generate additional UE-SID for future CB-access. Such additional UE-SID that may be used for future access may be stored by the UE before entering the PSM.

The embodiments described in FIGS. 1 and 2 may be used with another CB-access protocol, such as a 2-stage protocol. For example, the UE may transmit only a preamble, which includes only a contention header but no data field. The first downlink feedback from the ngNB after receiving the preamble may indicate the radio resources to be used by the UE to transmit the data in a CB mode, which may then be followed by a second downlink feedback signal. A 2-stage CB-access, therefore, may include a first access phase where full authentication, security, and setup are performed. In the second access phase, the UE-SID may be transmitted as part of a preamble sequence ID. Subsequent C-RNTI may then be made available in both UE and ngNB.

Figure 3:
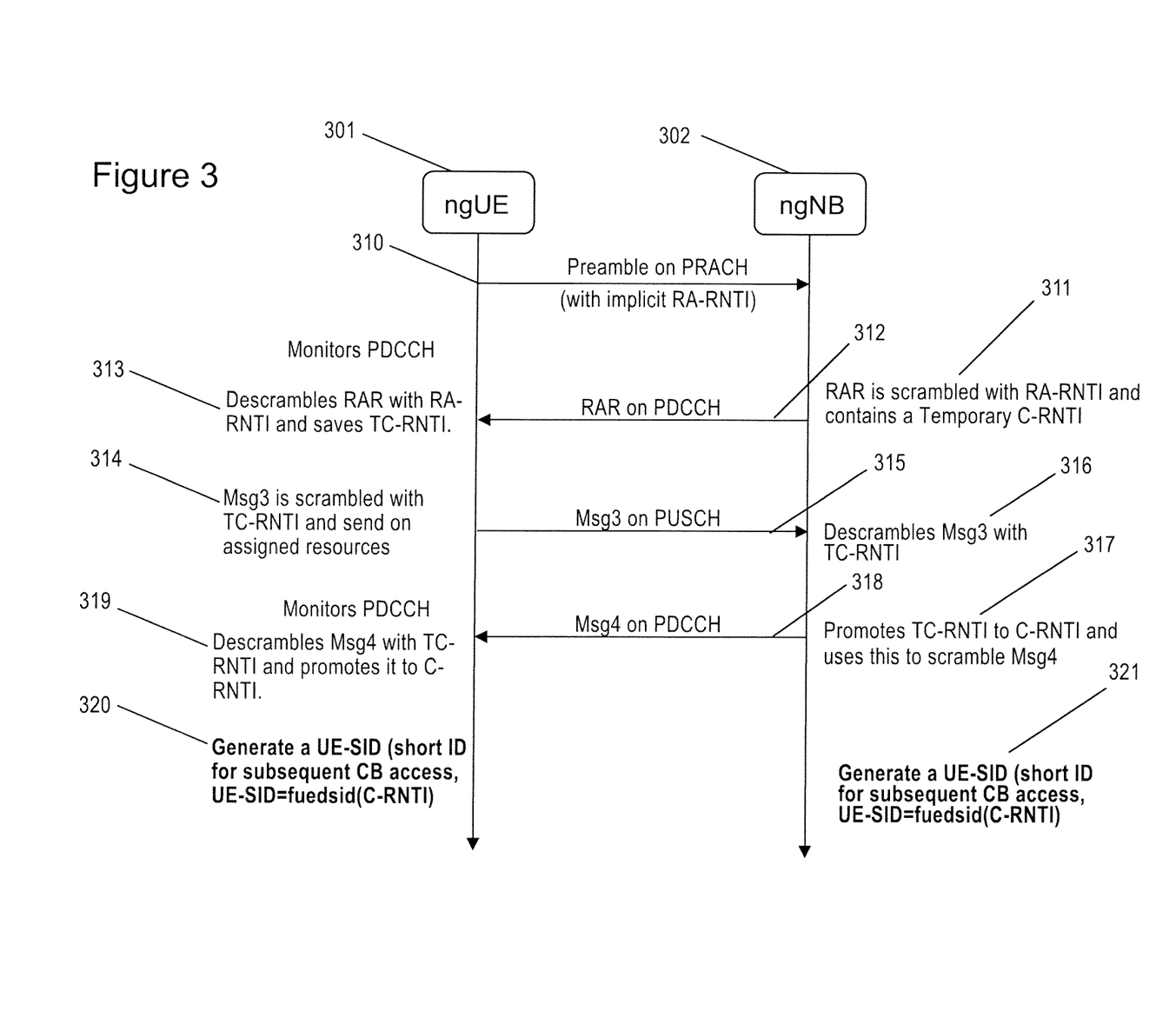
FIG. 3 illustrates a signal flow diagram according to certain embodiments.

FIG. 3 illustrates a signal flow diagram according to certain embodiments. In particular, FIG. 3 illustrates the signal flow of a radio access procedure shown in FIG. 1. In step 310, a user equipment 301, such as an ngUE, sends msg1 that includes a preamble on a physical random access channel (PRACH) to a network entity 302, such as an ngNB. The preamble may include at least an implicit RA-RNTI, similar to step 110 in FIG. 1. The ngUE may then monitor the PDCCH. In step 311, the ngNB may scramble or configure the MAC RAR with temporary C-RNTI, similar to step 120 in FIG. 1. In step 313, ngNB 302 sends msg2 comprising the RAR via the PDCCH to ngUE 301. ngUE 301 may monitor the PDCCH, and may descramble the RAR using the RA-RNTI, as shown in step 313. ngUE 301 may also save the temporary C-RNTI (TC-RNTI) received in msg2. The temporary C-RNTI in FIG. 3 may be the same as the C-RNTI shown in FIG. 1.

In step 314, msg3 is scrambled with the TC-RNTI, and sent to ngNB 302 on the assigned PUSCH, in step 315. Upon receipt, ngNB 302 receives msg3, and descrambles msg3 using TC-RNTI, as shown in step 316. The TC-RNTI may then be promoted to a non-temporary C-RNTI, as shown in step 317. ngNB 302 may then scramble msg4 with the non-temporary C-RNTI, and send msg4 on the PDCCH, as shown in step 318. UE 301 may monitor the PDCCH, and descramble msg4 with TC-RNTI, as shown in step 319. UE 301 may then also promote TC-RNTI to a non-temporary C-RNTI. In certain embodiments, UE 301 may then generate the UE-SID using the non-temporary C-RNTI, to be used for future or subsequent CB-access, as shown in step 320. In addition, in certain embodiments, ngNB 302 may also generate the UE-SID using the C-RNTI, as shown in step 321. In other words, in some embodiments only the UE may generate the UE-SID, while in other embodiments both the UE and the base station may independently generate the new UE-SID based on the fuesid( ), for example.

Figure 4:
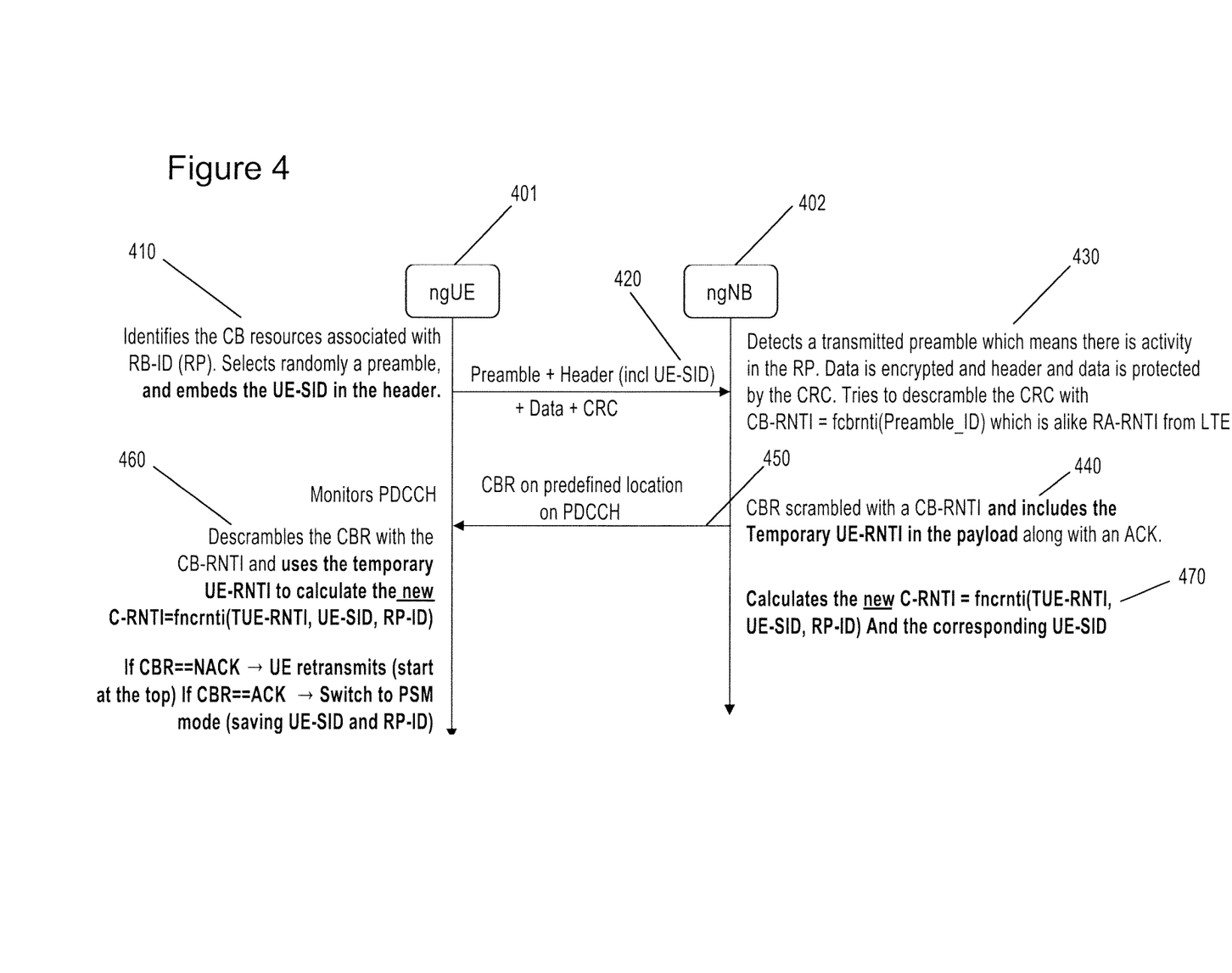
FIG. 4 illustrates a signal flow diagram according to certain embodiments.

FIG. 4 illustrates a signal flow diagram according to certain embodiments. In particular, FIG. 4 illustrates the signal flow of a radio access procedure shown in FIG. 2. FIG. 4 therefore shows signaling that occurs between ngUE 401 and ngNB 402 once the UE-SID has already been determined by the UE. In step 410, ngUE may identify the CB resources associated with the RP. The RP may include a certain number of radio bearers that may be used by ngUE 401 to transmit messages to ngNB 402. In step 410, ngUE 401 may also select a preamble, and the UE-SID may be embedded in the header of the CB-access message. The message may be include an implicit CB-RNTI, similar to FIG. 2. The preamble, in some embodiments, may be randomly selected. The message may then be sent in step 420 from ngUE 401 to ngNB 402. The message may include a preamble, a header including the UE-SID, data, and CRC information. The UE-SID may be exchanged to help the ngNB identify the UE from which the message is received. As can be seen in steps 460 and 470, in certain embodiments both the UE and the ngNB may independently generate a new UE-SID, based on for example the fuesid( ), without exchanging any of the new UE-SID between the UE and the ngNB.

In some embodiments, when transmitting the message from the UE to the ngNB, as shown in step 210 of FIG. 2 and step 420 of FIG. 4, the UE may include only a subset of the UE-SID bits to the ngNB. In other words, the UE may transmit only a subset of the UE-SID bits to the ngNB. The ngNB may also, in some embodiments, signal at least a subset of the UE-SID bits to the UE, as shown in step 230 of FIG. 2.

In step 430, ngNB 402 may receive the transmitted preamble. Upon receiving the preamble, ngNB 402 may detect that activity may be occurring in a given RP. The message may also include encrypted data, and the header as well as the data may be protected by the CRC. ngNb 402 may attempt to descramble the CRC using the with CB-RNTI, in a similar matter to descrambling of the RA-RNTI in LTE. In certain embodiments, ngNB 402 may only attempt to descramble the header in order to retrieve the UE-SID. Once the header descrambled, ngNB 402 may thereafter attempt to descramble the data contained in the message.

In step 440, the ngNB may have already retrieved the UE-SID, and generated the UE-RNTI. The UE-RNTI may then be explicitly included in the CBR. The CBR, in some embodiments, may also include an ACK, since ngNB 402 was able to successfully retrieve the UE-SID. The CBR, or the CRC of the CBR, may be scrambled with the temporary CB-RNTI. In step 450, ngNB 402 sends the CBR to a predefined location of the ngUE 401 on the PDCCH. ngUE 401 may monitor the PDCCH, and receive the CBR. ngUE 401 may then descramble the CBR using the CB-RNTI, and retrieve or extract the UE-RNTI that was generated at ngNB 402, as shown in step 240 of FIG. 2. Using the UE-SID, the UE-RNTI, and/or the RP-ID, ngUE 401 may calculate a subsequent or new C-RNTI.

If a NACK is included in the CBR, ngUE 401 may repeat steps 410 and 420. If an ACK is received, however, ngUE 401 may switch to PSM mode, and save the UE-SID for use in at least one other future or subsequent access instance. When entering PSM modes, ngUE 401 may discard the subsequent or new C-RNTI. Meanwhile, in step 470 ngNB 402 may also calculate the new C-RNTI based on at least the UE-RNTI, the UE-SID, and/or the RP-ID, similar to step 220 in FIG. 2.

Figure 5:
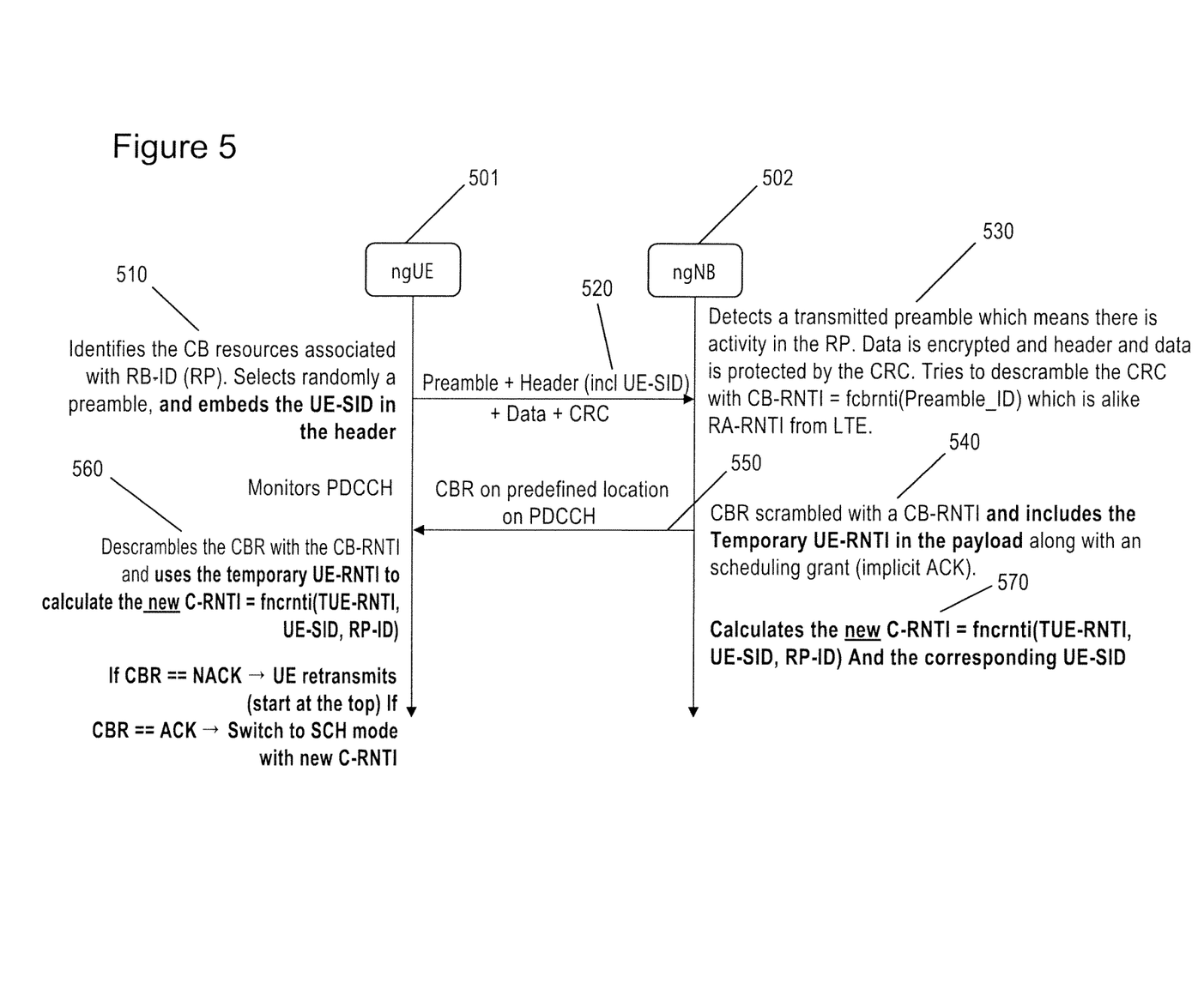
FIG. 5 illustrates a signal flow diagram according to certain embodiments.

FIG. 5 illustrates a signal flow diagram according to certain embodiments. Steps 510, 520, 530 are similar to steps 410, 420, 430 in FIG. 4. In step 540, however, ngNB 502 scrambles the CBR with both the UE-RNTI and with a scheduling grant. The CBR may then be sent from ngNB 502 to ngUE 501 on the PDCCH, in step 550. In step 560, ngUE 501 descrambles the CBR using the CB-RNTI, and retrieves or extracts both the UE-RNTI and the scheduling grant from the CBR. The ACK may be implicit in the sending of the scheduling grant to ngUE 501. The UE may then calculate the subsequent or new C-RNTI using at least the UE-SID, the UE-RNTI, and/or the RP-ID. Because the CBR included a scheduling grant, which may be an implicit acknowledgment, the ngUE 401 may use the subsequent or new C-RNTI to switch to a scheduled based access mode, as shown in step 250 of FIG. 2.

As discussed above, the embodiments shown in FIGS. 4 and 5 slightly differ. In the embodiment shown in FIG. 4, the UE received an ACK from the base station, such as ngNB, and enters a PSM. The UE may discard the subsequent new C-RNTI, but keep the UE-SID. In FIG. 5, on the other hand, the UE receives a scheduling grant, which may be interpreted by the UE as an ACK. The UE may then switch from CB access to scheduled based access using the subsequent or new C-RNTI. The UE may then begin transmitting signals or data using the scheduling based access.

Figure 6:
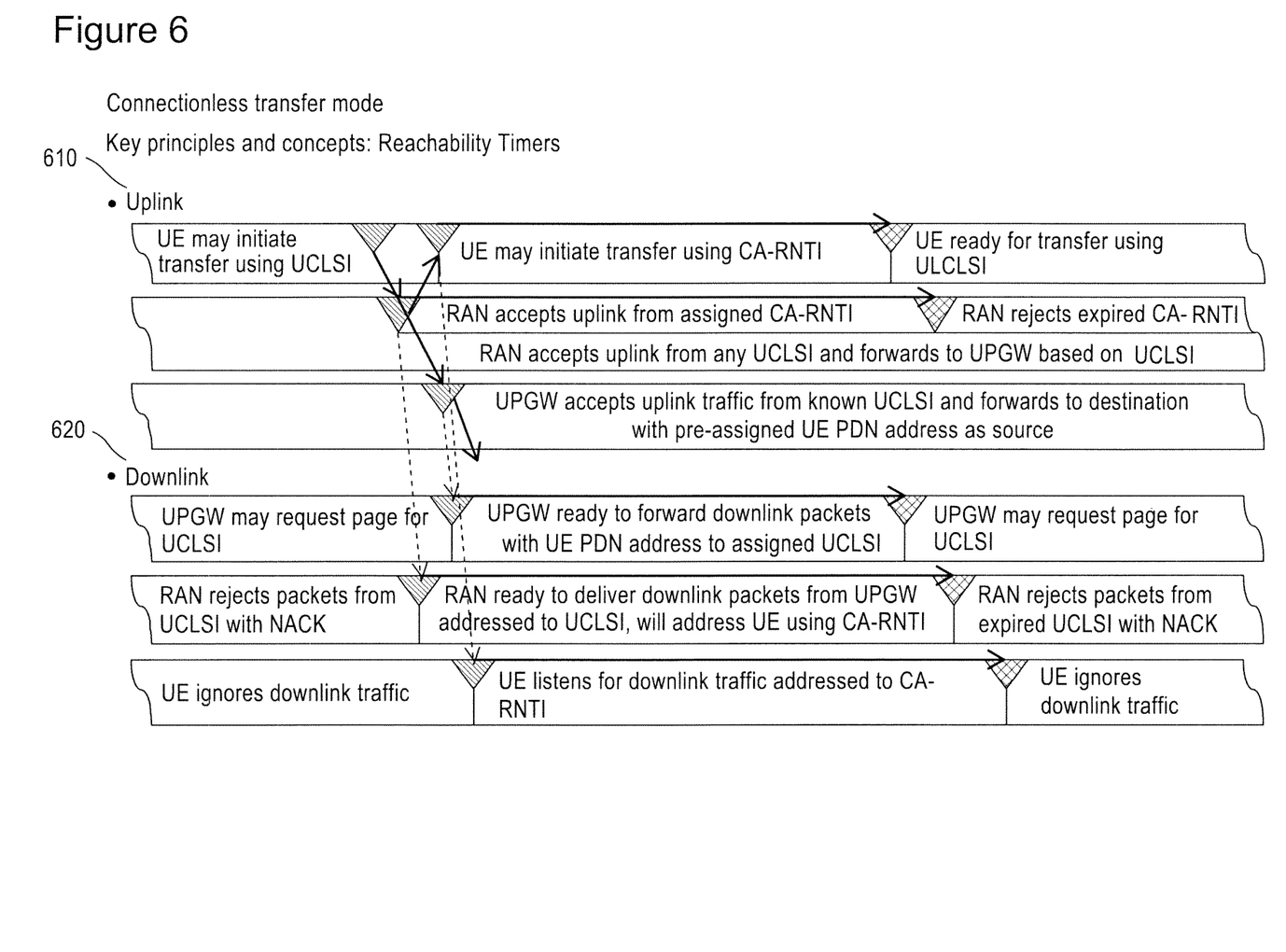
FIG. 6 illustrates a diagram according to certain embodiment.

FIG. 6 illustrates a diagram according to certain embodiments. In particular, FIG. 6 illustrates using the embodiments shown in FIGS. 2, 4, and 5 as a short version of a user plane gateway (UPGW) connectionless (CL) service identification (UCLSI) to reduce RAN-core signaling overhead. Specifically, the embodiments described above may be used on the air interface part of the UCLSI. UCLSI may be used by the UE, the RAN, and/or the UPGW to identify a packet data unit (PDU) session with connectionless mode data to transfer on the RAN-core interface. The UCLSI may include an identifier of the UPGW serving the PDU session and a local identifier for a specific connectionless PDU session for a specific UE. RAN may also use UCLSI to derive the UPGW that should handle the data exchanged with the UE. A UE may be allocated one or more UCLSI and/or one or more UPGW.

FIG. 6 is divided into an uplink side 610 and a downlink side 620. As can be seen in uplink side 610, the UE may initiate the transfer using UCLSI. The RAN may then accept the uplink from any UCLSI and forward the received traffic to UPGW based on the UCLSI. The UPGW may accept the uplink traffic from the known UCLSI, and forward the traffic to the destination with pre-assigned UE packet data network (PDN) address. In the downlink side 620, the RAN may be ready to deliver downlink packets from UPGW addressed to UCLSI, and may address the UE using CA-RNTI.

In another embodiment, the UE may initiate the transfer using CA-RNTI. The RAN may then accept uplink from assigned CA-RNTI, or may reject CA-RNTI that are expired. The UE may listen for the downlink traffic addressed to CA-RNTI. In some embodiments, the UPGW request a page for UCLSI in downlink side 620. In other embodiments, the RAN may reject packets from the UCLSI with NACK or the UE may ignore downlink traffic.

Figure 7:
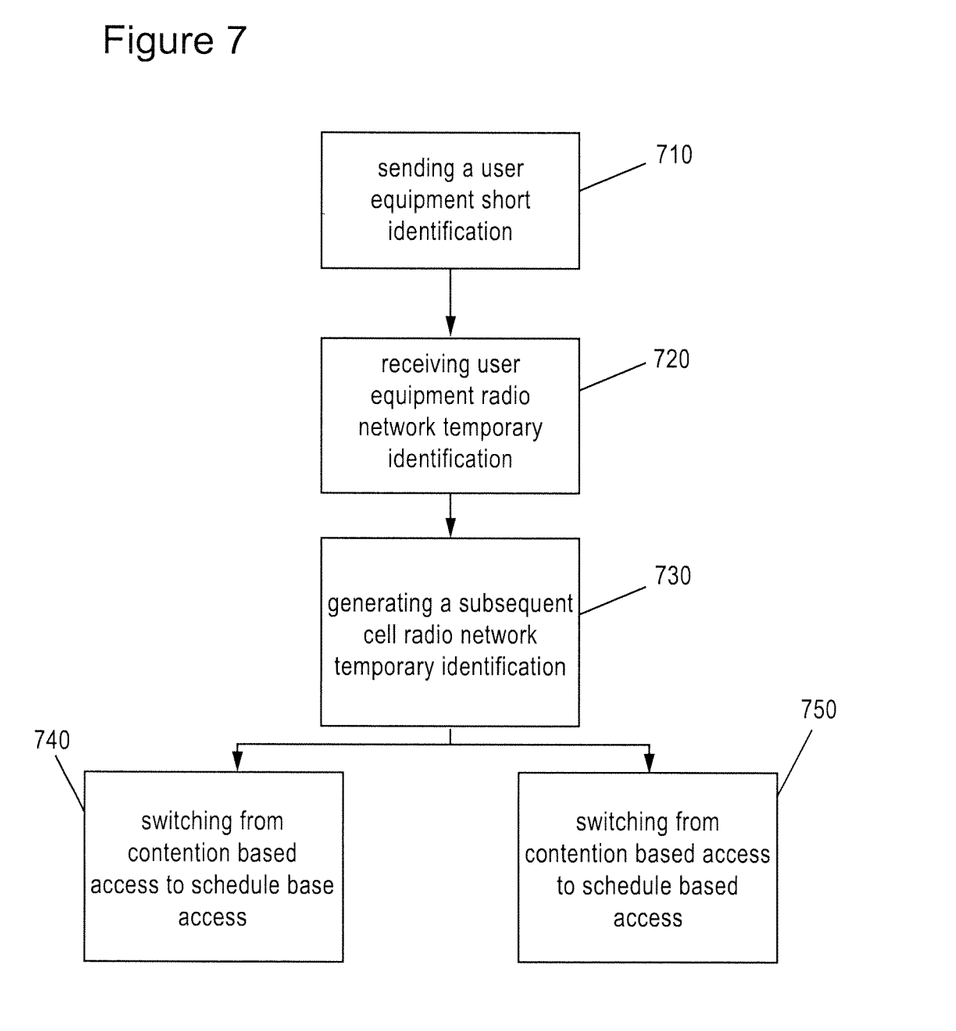
FIG. 7 illustrates a flow diagram according to certain embodiments.

FIG. 7 illustrates a flow diagram according to certain embodiments. In particular, FIG. 7 illustrates an embodiment from the perspective of the UE, such as ngUE 401 in FIG. 4 or ngUE 501 in FIG. 5. In step 710, the UE may send the UE-SID to a base station, during a contention based access instance. A contention based access instance may be the initiation of a radio access procedure. The UE-SID may be generated based on an initial cell radio network temporary identification. In step 720, the UE may receive the UE-RNTI from the base station. The UE-RNTI may be included in a CBR sent from the base station. The UE-RNTI may in some embodiments be generated at random. In addition to receiving the UE-RNTI, the UE may also receive an ACK or a NACK. When the UE receives a NACK, it may retransmit the UE-SID to the base station.

In step 730, the UE may generate a subsequent or new C-RNTI using the UE-SID, the received UE-RNTI, and/or the RP-ID. In step 740, the UE may use the subsequent or new C-RNTI to switch from the contention based access to a scheduled based access. The UE may then transmit data or signals to a base station using the scheduled based access. In other embodiments, as shown in step 750, the UE may enter a power savings mode. When entering the power saving mode, the UE may discard the subsequent or new C-RNTI, while keeping the UE-SID. In some embodiments, the UE may generate a next or subsequent UE-SID to use in future contention based access instances.

Figure 8:
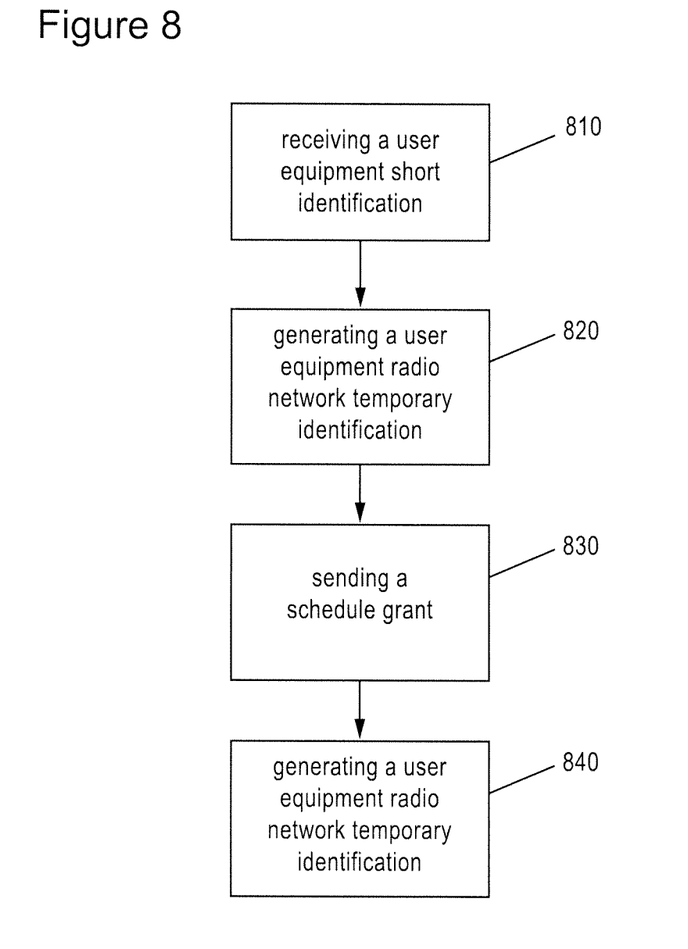
FIG. 8 illustrates a flow diagram according to certain embodiments.

FIG. 8 illustrates a flow diagram according to certain embodiments. In particular, FIG. 8 illustrates an embodiment from the perspective of a base station, such as ngNB 402 in FIG. 4 or ngNB 502 in FIG. 5. In step 810, the base station may receive a US-SID at the base station from the user equipment during a contention based access instance. The UE-SID identification is based on an initial cell radio network temporary identification. The base station may then generate UE-RNTI at random, and send the UE-RNTI to the UE as part of the CBR, as shown in step 820.

As shown in step 830, the base station may also include a schedule grant in the CBR. The schedule grant may be used by the UE to switch from the contention based access to a scheduled based access using the C-RNTI. The schedule grant may be considered as an implicit ACK by the UE. In other embodiments, however, the base station may include an explicit ACK or NACK. In step 840, the base station may generate a subsequent or new C-RNTI based on the UE-SID, the UE-RNTI, and/or the RP-ID.

Figure 9:
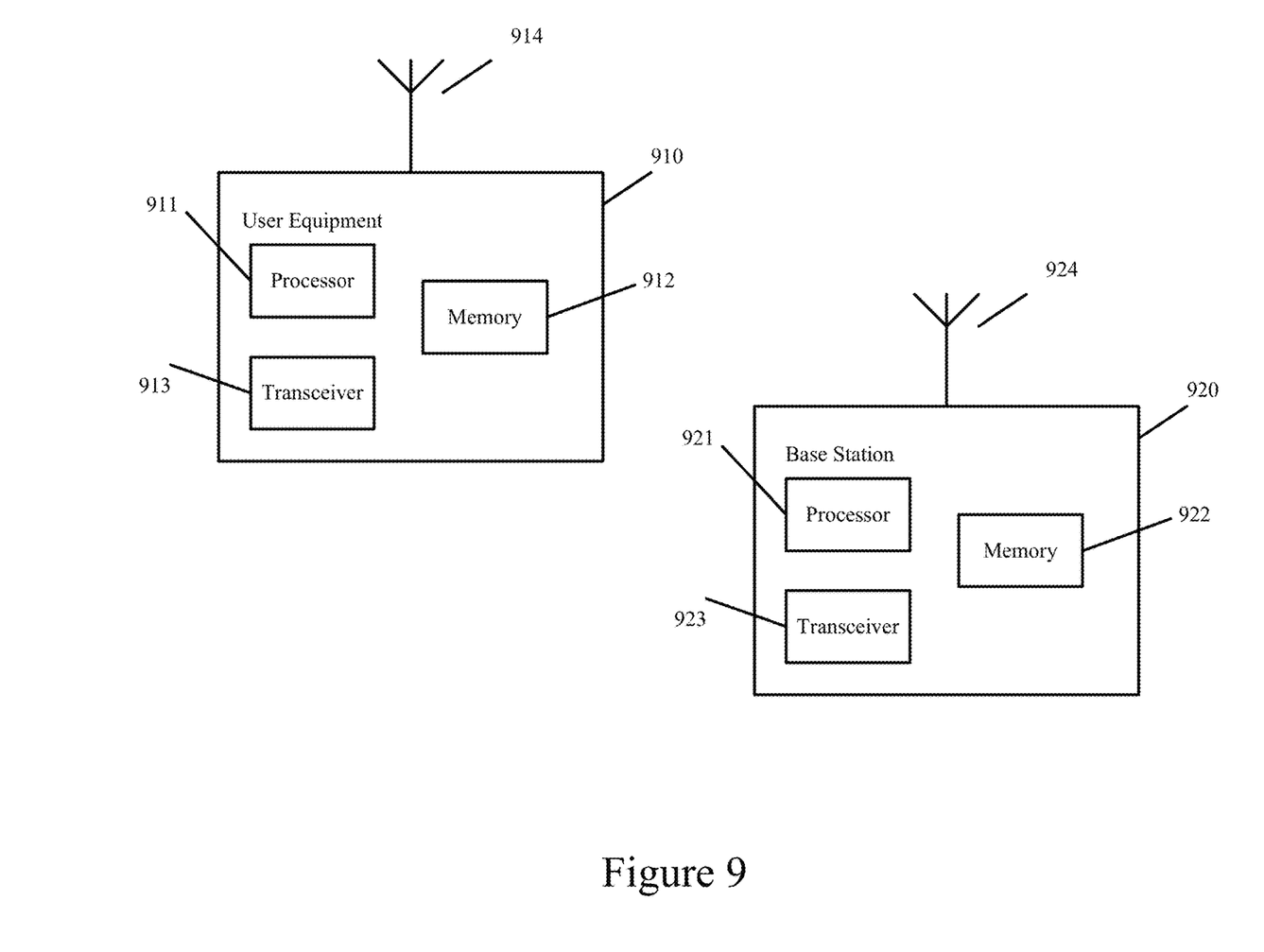
FIG. 9 illustrates a system according to certain embodiments.

FIG. 9 illustrates a system according to certain embodiments. It should be understood that each signal or block in FIGS. 1-8 may be implemented by various means or their combinations, such as hardware, software, firmware, one or more processors and/or circuitry. In one embodiment, a system may include several devices, such as, for example, base station 920 or UE 910. The system may include more than one UE 910 and more one base station 920. Base station 920 may be a new generation NodeB (ngNB), a 5G NodeB (5GNB), or an eNB. In other embodiments, base station 920 may be any other network node, access node, server, or host.

Each of these devices may include at least one processor or control unit or module, respectively indicated as 911 and 921. At least one memory may be provided in each device, and indicated as 912 and 922, respectively. The memory may include computer program instructions or computer code contained therein. One or more transceiver 913 and 923 may be provided, and each device may also include an antenna, respectively illustrated as 914 and 924. Although only one antenna each is shown, many antennas and multiple antenna elements may be provided to each of the devices. Other configurations of these devices, for example, may be provided. For example, base station 920 and UE 910 may be additionally configured for wired communication, in addition to wireless communication, and in such a case antennas 914 and 924 may illustrate any form of communication hardware, without being limited to merely an antenna.

Transceivers 913 and 923 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 910 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. User equipment 910 may also be a new generation user equipment. In other embodiments, the user equipment may be replaced with a machine communication device that does not require any human interaction, such as a sensor or a meter.

In some embodiments, an apparatus, such as a user equipment or a base station, may include means for carrying out embodiments described above in relation to FIGS. 1-8. In certain embodiments, at least one memory including computer program code can be configured to, with the at least one processor, cause the apparatus at least to perform any of the processes described herein.

Processors 911 and 921 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as base station 920 or UE 910, to perform any of the processes described above (see, for example, FIGS. 1-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 9 illustrates a system including a base station 920 and UE 910, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 910 may likewise be provided with a variety of configurations for communication other than communicating with base station 920. For example, the UE 910 may be configured for device-to-device, machine-to-machine, or vehicle-to-vehicle communication.

The above embodiments provide for improvements to the functioning of a network and/or to the functioning of the network entities or computers within the network, or the user equipment communicating with the network. Specifically, certain embodiments allow for a shorter UE identification to be transmitted to the network, which reduces the content based signaling overhead. In addition, update procedures for receiving a new C-RNTI may be less frequency, since the UE and the base station may both generate new or subsequent C-RNTI on their own. In addition, network resources may be conserved because the UE may not signal the new or subsequent C-RNTI to the base station. Rather, both the UE and the base station are capable of producing their own new or subsequent C-RNTI.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to a 5G or new radio environments, other embodiments can be directed to other 3GPP technology, such as LTE-advanced, Internet of Things technology, $4^{th}$ generation technology, or any other communication system that includes radio signals.

Partial Glossary

3GPP 3rd Generation Partnership Project
LTE Long Term Evolution
RA Radio Access
RAN Radio Access Network CB Contention Based
SB Scheduled Based
SCH Scheduled
RRC Radio Resource Control
5G 5th generation
NR New Radio
NG New Generation
RNTI Radio Network Temporary Identification
MAC Media Access Control
ngNB New Generation NodeB
UE User Equipment
ngUE New Generation UE
RAR Random Access Response
C-RNTI Cell RNTI
PDCCH Physical Downlink Control Channel
CRC Cyclic Redundancy Check
UE-SID UE Short Identification
CBR CB-Access Response
ACK Acknowledgement
NACK Negative Acknowledgment
RP Resource Pool
RP-ID Resource Pool Identification
PSM Power Saving Mode
PRACH Physical Random Access Channel
TC-RNTI Temporary C-RNTI
UCLSI User Plane Gateway Connectionless Service identification
PDU Packet Data Unit

We claim:

1. An apparatus comprising:
   at least one memory comprising computer program code;
   at least one processor;
   wherein the at least one memory and the computer program code are configured, with the at least one processor, to cause the apparatus at least to:
   send a short identification from a user equipment to a base station during a contention based access instance, wherein the short identification is generated based on an initial cell radio network temporary identification;
   receive at the user equipment a user equipment radio network temporary identification from the base station; and
   generate at the user equipment a subsequent cell radio network temporary identification based at least on the short identification and the received user equipment radio network temporary identification.

2. The apparatus according to claim 1, wherein the at least one memory and the computer program code are configured, with the at least one processor, to cause the apparatus at least to:
   switch from the contention based access to a scheduled based access using the subsequent cell radio network temporary identification.

3. The apparatus according to claim 2, wherein the at least one memory and the computer program code are configured, with the at least one processor, to cause the apparatus at least to:
   transmit data from the user equipment to a base station using the scheduled based access.

4. The apparatus according to claim 1, wherein the at least one memory and the computer program code are configured, with the at least one processor, to cause the apparatus at least to:
   enter a power saving mode after generating at the subsequent cell radio network temporary identification.

5. The apparatus according to claim 4, wherein the at least one memory and the computer program code are configured, with the at least one processor, to cause the apparatus at least to:
   discard the subsequent cell radio network temporary identification when entering the power saving mode.

6. The apparatus according to claim 1, wherein the at least one memory and the computer program code are configured, with the at least one processor, to cause the apparatus at least to:
   generate at the user equipment a new short identification based on the subsequent cell radio network temporary identification, wherein the new short identification is used in future contention based access instances.

7. The apparatus according to claim 1, wherein the at least one memory and the computer program code are configured, with the at least one processor, to cause the apparatus at least to:
   receive at the user equipment a contention based access response comprising an acknowledgement or a negative acknowledgment, wherein the contention based response also comprises the user equipment radio network temporary identification.

8. The apparatus according to claim 7, wherein the at least one memory and the computer program code are configured, with the at least one processor, to cause the apparatus at least to:
   retransmit from the user equipment the short identification upon receiving of the negative acknowledgement.

9. The apparatus according to claim 1, wherein the short identification is included in the contention based header data sent to the base station.

10. The apparatus according to claim 1, wherein the generating of the subsequent cell radio network temporary identification is based at least on a resource pool from which the user equipment has initiated the contention based access.

11. The apparatus according to claim 1, wherein a length of the short equipment identification is based on the capacity of a contention based physical layer configuration.

12. The apparatus according to claim 1, wherein the short identification is shorter in length than the user equipment radio network temporary identification.

13. An apparatus comprising:
    at least one memory comprising computer program code;
    at least one processor;
    wherein the at least one memory and the computer program code are configured, with the at least one processor, to cause the apparatus at least to:
    receive a short identification at a base station from a user equipment during a contention based access instance, wherein the short identification is based on an initial cell radio network temporary identification;
    generate at the base station a user equipment radio network temporary identification;
    generate at the base station a subsequent cell radio network temporary identification based at least on the short identification and the user equipment radio network temporary identification.

14. The apparatus according to claim 13, wherein the at least one memory and the computer program code are configured, with the at least one processor, to cause the apparatus at least to:
    switch from the contention based access to a scheduled access based access using the subsequent cell radio network temporary identification.

15. The apparatus according to claim 14, wherein the at least one memory and the computer program code are configured, with the at least one processor, to cause the apparatus at least to:
receive data from the user equipment to a base station using the scheduled access.

16. The apparatus according to claim 13, wherein the user equipment radio network temporary identification is shorter in length than the subsequent cell radio network temporary identification.

17. The apparatus according to claim 13, wherein the short identification is included in header data during the contention based access instance received by the base station.

18. The apparatus according to claim 13, wherein the at least one memory and the computer program code are configured, with the at least one processor, to cause the apparatus at least to:
send a contention based response comprising an acknowledgement or a negative acknowledgement.

19. The apparatus according to claim 13, wherein the generating of the subsequent cell radio network temporary identification is based at least on a resource pool from which the user equipment has initiated the contention based access.

20. The apparatus according to claim 13, wherein the at least one memory and the computer program code are configured, with the at least one processor, to cause the apparatus at least to:
decode or decrypting at the base station the sent header including the short identification.

\* \* \* \* \*